United States Patent
Kvartskhava et al.

(10) Patent No.: US 8,959,485 B2
(45) Date of Patent: Feb. 17, 2015

(54) SECURITY PROTECTION DOMAIN-BASED TESTING FRAMEWORK

(75) Inventors: Boris Kvartskhava, St. Petersburg (RU); Vasily Isaenko, Petergof (RU); Alexander Alexeev, St. Petersburg (RU)

(73) Assignee: Oracle International Corporation, Redwood City, CA (US)

( * ) Notice: Subject to any disclaimer, the term of this patent is extended or adjusted under 35 U.S.C. 154(b) by 53 days.

(21) Appl. No.: 13/532,586

(22) Filed: Jun. 25, 2012

(65) Prior Publication Data
US 2013/0254832 A1    Sep. 26, 2013

(51) Int. Cl.
*G06F 9/44* (2006.01)
*G06F 11/36* (2006.01)

(52) U.S. Cl.
CPC ............ *G06F 11/36* (2013.01); *G06F 11/3664* (2013.01)
USPC ............................. 717/124; 717/126; 717/127

(58) Field of Classification Search
CPC .. G06F 11/36; G06F 11/3664; G06F 11/3672
USPC .................................................. 717/124–127
See application file for complete search history.

(56) References Cited

U.S. PATENT DOCUMENTS

| | | | | |
|---|---|---|---|---|
| 7,174,542 B2 * | 2/2007 | Wang et al. | .................... | 717/124 |
| 7,389,495 B2 * | 6/2008 | Wang et al. | .................... | 717/126 |
| 7,478,365 B2 * | 1/2009 | West et al. | .................... | 717/124 |
| 7,526,681 B2 * | 4/2009 | Anafi et al. | ................. | 714/38.14 |
| 7,543,275 B2 * | 6/2009 | Kuturianu et al. | ............ | 717/124 |
| 2006/0143179 A1 * | 6/2006 | Draluk et al. | ...................... | 707/9 |
| 2006/0277231 A1 * | 12/2006 | Kral et al. | ..................... | 708/102 |

OTHER PUBLICATIONS

JavaTM ME TCK Framework Developers Guide ver. 1.2.1; Aug. 2008; pp. 19-20; Sun Microsystems, Inc.; http://docs.oracle.com/javame/test-tools/me-fw/framework_dev_guide.pdf, viewed Jun. 3, 2013.*
JavaTM ME TCK Framework Developers Guide ver. 1.2.1; Aug. 2008; pp. 3-4, 13, 19-20 and 85; Sun Microsystems, Inc.; http://docs.oracle.com/javame/test-tools/me-fw/framework_dev_guide.pdf, viewed Jun. 3, 2013.*
Java™ ME TCK Framework Developers Guide, Version 1.2.1 Sun Microsystems, Inc., Aug. 2008, pp. 1-142.

(Continued)

*Primary Examiner* — Saleh Najjar
*Assistant Examiner* — Feliciano Mejia
(74) *Attorney, Agent, or Firm* — Robert C. Kowert; Meyertons, Hood, Kivlin, Kowert & Goetzel, P.C.

(57) ABSTRACT

Methods and apparatus for security protection domain-based testing. A testing framework enables the same certification tests to be run across different protection domains or operation modes, and on different platforms or devices. The testing framework may, for example, be directed to testing implementations of the Java Platform, Micro Edition (Java ME®) using Connected Device Configuration (CDC) or Connected Limited Device Configuration (CLDC) as the configuration layer and Mobile Information Device Profile (MIDP) as the profile layer. Different Mobile Information Device Profile (MIDP) specifications (e.g., MIDP 2.x and MIDP 3.x specifications) may be supported. The testing framework may be deployed in the context of compatibility testing and technology compatibility kits (TCKs). The testing framework may, for example, be applied in compatibility testing for Java ME® platform technology implementations.

20 Claims, 10 Drawing Sheets

(56) References Cited

OTHER PUBLICATIONS

TCK Project Planning and Development Guide, Version 1.2 Sun Microsystems, Inc., Aug. 2003, pp. 1-82.
Security and Trust Services API (SATSA) for Java™ 2 Platform, Micro Edition, Version 1.0 Sun Microsystems, Inc., Jul. 28, 2004, pp. 1-214.
MIDP 3.0 overview Aplix Corporation, 2008 pp. 1-40.
Mobile Information Device Profile for Java™ Micro Edition Version 3.0 Motorola, Inc. Nov. 3, 2009, pp. 1-908.
Mobile Information Device Profile for Java™ 2 Micro Edition Version 2.1 Sun Microsystems, Inc. and Motorola, Inc. May 26, 2006, pp. 1-577.

* cited by examiner

*TABLE 1*

| Attribute name | Attribute description and requirements to the security environment |
|---|---|
| suitableForDomains <domain ID list> | Test must be run in all domains from:<br><br><domain ID list>.<br><br>If this Test Description includes the attributes "grant" and/or "deny", all domains listed must allow these attribute requirements to be followed. |
| doubleDutySecurity yes | During run time, the test description will be duplicated to all domains that do not contradict the test description's attributes:<br>• grant<br>• deny<br><br>Duplicated copies include the attribute:<br><br>suitableForDomains="ID"<br><br>for all domains defined in the test framework if the original test description did not include:<br><br>suitebleForDomains=<domain ID list>,<br><br>and otherwise would include all domains mentioned in:<br><br>suitebleForDomains=<domain ID list> |
| grant <permissions list> | The test may only be run in domains where all permissions from <permissions list> are either Allowed or User. |
| deny <permissions list> | The test may only be run in domains where all permissions from <permissions list> will be denied during the test run. |

*FIG. 4*

TABLE 2

| How permission is present in the test description | Permission mode in current protection domain | | |
|---|---|---|---|
| | Allowed | User | Not Permitted |
| Grant ..."P" ... | Permission is requested in the mandatory permission request | Permission is requested in the mandatory permission request | Test will not be selected for execution in current protection domain |
| Deny ... "P" ... | Permission is not requested in the manifest | Permission is not requested in the manifest | Permission is not requested in the manifest |

FIG. 5

TABLE 3

| "P" | What goes into the permission request if an MIDP 2.x implementation is tested | What goes into the permission request if an MIDP 3.x implementation is tested |
|---|---|---|
| MIDP 2.x permission | "P" | Result of lookup (MIDP 3.x permission) |
| MIDP 3.x permission | Result of lookup (MIDP 2.x permission) | "P" |

SECURITY PROTECTION DOMAIN-BASED TESTING FRAMEWORK

PRIORITY INFORMATION

This application claims benefit of priority of Russian Patent Application Serial No. 2012110523 entitled "Security Protection Domain-Based Testing Framework" filed Mar. 20, 2012, the content of which is incorporated by reference herein in its entirety.

BACKGROUND

Java Platform, Micro Edition (Java ME®) is a Java® platform primarily targeted to relatively limited mobile and/or embedded devices including but not limited to mobile/cell phones, smart phones, tablet or pad device, Personal Digital Assistants (PDAs), cameras, control devices, set-top boxes, game consoles, home appliances, and so on. Java and Java ME are trademarks or registered trademarks of Oracle, Inc. and/or its affiliates in the United States and other countries.

FIG. 1 is a block diagram illustrating a conventional Java ME® platform stack 20 on a device. A virtual machine (VM) 22 and a configuration 24 are layered on top of an operating system (OS) 10 of the device. Example VMs include the Java Virtual Machine (JVM) and the Kernel Virtual Machine (KVM). A configuration 24 provides a set of lower level application programming interfaces (APIs). A configuration 24 provides a basic set of libraries and virtual-machine features that must be present in an implementation of a Java ME® environment. One or more profiles 26 are layered on top of the configuration 24. The profile(s) 26 provide higher level APIs for different classes of devices. A profile 26 is a set of standard APIs that support a category of devices for a specific configuration 24. A specific profile 26 may be combined with a corresponding configuration 24 to provide a complete Java® application environment for a target device class. On top of the profile(s) 26 may be one or more optional packages 30 that provide APIs for device-specific features. Various applications 40 that conform to the to the profile(s) 26 may be implemented on the device.

As an example of a profile 26, Mobile Information Device Profile (MIDP) is a specification published for the use of Java on relatively limited mobile and/or embedded devices. The MIDP specification defines a platform for dynamically and securely deploying optimized, graphical, networked applications 40. Note that an application that conforms to MIDP may be referred to as an MIDP applet, or MIDlet. MIDP is part of the Java ME® framework and is layered on top of a configuration 24 that provides a set of lower level APIs. Examples of other profiles that may be used in some platform stack implementations include, but are not limited to, Personal Basis Profile (PBP), and Personal Profile (PP). Examples of configurations 24 include Connected Device Configuration (CDC) and Connected Limited Device Configuration (CLDC). When combined with CDC or CLDC, MIDP provides a standard Java® runtime environment for relatively limited mobile and/or embedded devices. The configuration 24 (e.g., CDC or CLDC) and profile(s) 26 (e.g., MIDP 2.x or 3.x) together provide the core application functionality required by applications on the target devices such as mobile applications in the form of a standardized Java® runtime environment and a set of Java® APIs. Using MIDP (or other profiles, in some implementations), developers can develop applications once, and deploy the applications quickly to a wide variety of devices.

Different versions of MIDP, for example MIDP 2.x and MIDP 3.x, may be used in various Java ME® platforms on a variety of devices. In addition, the MIDP specification defines several security protection domains (which may be referred to as protection domains for simplicity). A protection domain may be defined as a set of permissions that controls which protected APIs an applet can use. For example, MIDP 2.x and/or MIDP3.x may support the following protection domains as defined by the respective specification: Operator, Manufacturer, Identified 3rd Party, Unidentified 3rd Party, and Custom.

Depending on the profile specification, a protection domain may expose different behaviors and requirements for security-sensitive APIs. In other words, the protection domains may be viewed as operation modes. Implementations of the Java ME® platform being developed for deployment may need to be tested under these different operation modes in order to validate behavior to determine if the Java ME® platform implementations conform to the protection domains as defined by the profile specifications. In addition to testing across the different protection domains, the testing may need to be performed for different versions of the profile specification, for example MIDP 2.x and MIDP 3.x specifications. In addition, the testing may need to be performed on different devices, for example mobile and/or embedded devices from different vendors or manufacturers or different versions of mobile and/or embedded devices from the same vendor or manufacturer.

However, conventional testing frameworks for Java ME® platform implementations do not readily support testing across different protection domains, profile specification versions, and devices. Conventional test suites run tests only in one protection domain, or operation mode. Conventionally, to test in the different protection domains or operation modes according to the different versions of the MIDP specification and to test on different platforms, different tests have to be developed and run.

SUMMARY

Embodiments of methods and apparatus for security protection domain-based testing are described. A testing framework is described that enables the same certification tests to be run across different protection domains or operation modes, and on different platforms or devices. For each protection domain to be tested, the testing framework automatically selects the appropriate tests that have the correct permissions. Embodiments of the testing framework may, for example, be directed to testing implementations of the Java Platform, Micro Edition (Java ME®) using Connected Device Configuration (CDC) or Connected Limited Device Configuration (CLDC) as the configuration layer and Mobile Information Device Profile (MIDP) as the profile layer. Different Mobile Information Device Profile (MIDP) specifications (e.g., MIDP 2.x and MIDP 3.x specifications) may be supported.

Embodiments of the testing framework may be deployed in the context of compatibility testing and technology compatibility kits (TCKs). Embodiments of the testing framework may, for example, be applied in compatibility testing for Java ME® platform technology implementations. Compatibility testing may be defined as the process of testing an implementation to make sure it is compatible with a corresponding Java® technology specification, e.g. a Java® Specification Request (JSR). A suite of tests contained in a technology compatibility kit (TCK) may be used to test that the implementation meets and passes all of the compatibility rules of that JSR. The implementation under test may be on a separate device (the unit under test) than the testing device that implements the TCK including the testing framework.

A method for applying the security protection domain-based testing framework in a certification process for certifying various Java ME® platform implementations may include a configuration phase and a test execution phase. In the configuration phase, a security mode may be selected in which the test(s) are to be run. For example, either MIDP 2.x or MIDP 3.x may be selected. Permissions for the selected security mode may be created. A mapping of the permissions between security modes may be performed. For example, the permissions may be mapped from MIDP 2.x to MIDP 3.x, or vice versa. Protection domain editing and validation may then be performed. As part of the configuration process, all protection domains to be considered may be described as part of the runtime testing framework description, for example using a domain editor component of the testing framework. During the process of describing the protection domains, the testing framework validates the protection domain descriptions against test suite security assumptions, and may only allow the configuration to be completed if all of the test suite security assumptions are met for all of the protection domain descriptions.

In the test execution phase, test(s) are evaluated and executed on the unit under test for each protection domain in which the test(s) are to be run. In at least some embodiments, in an outer loop, the protection domains are iterated, and in an inner loop, each of the tests are evaluated for the current protection domain according to one or more criteria and, if the evaluation determines that the test is to be run for this protection domain, the test is queued for execution. Otherwise, the test is not performed for the current protection domain.

After the tests are executed on the unit under test, results of the tests are evaluated. If all the tests passed, then certification of this implementation is done. Otherwise, if any test does not pass, then the test failure(s) may be evaluated, and the Java ME® platform implementation may be modified accordingly to fix any problems that were identified. The certification process may then be performed again for the implementation.

BRIEF DESCRIPTION OF THE DRAWINGS

FIG. 4 is a table of test description attributes that may be used in the security testing approach implemented by the testing framework, according to at least some embodiments.

FIG. 5 is a table that shows how "Grant" and "Deny" permissions are present in the test description and the respective permission modes in the current protection domain, according to at least some embodiments.

FIG. 6 is a table of rules for mapping permissions between MIDP versions (MIDP 2.x and MIDP 3.x), according to at least some embodiments.

Figure 1:
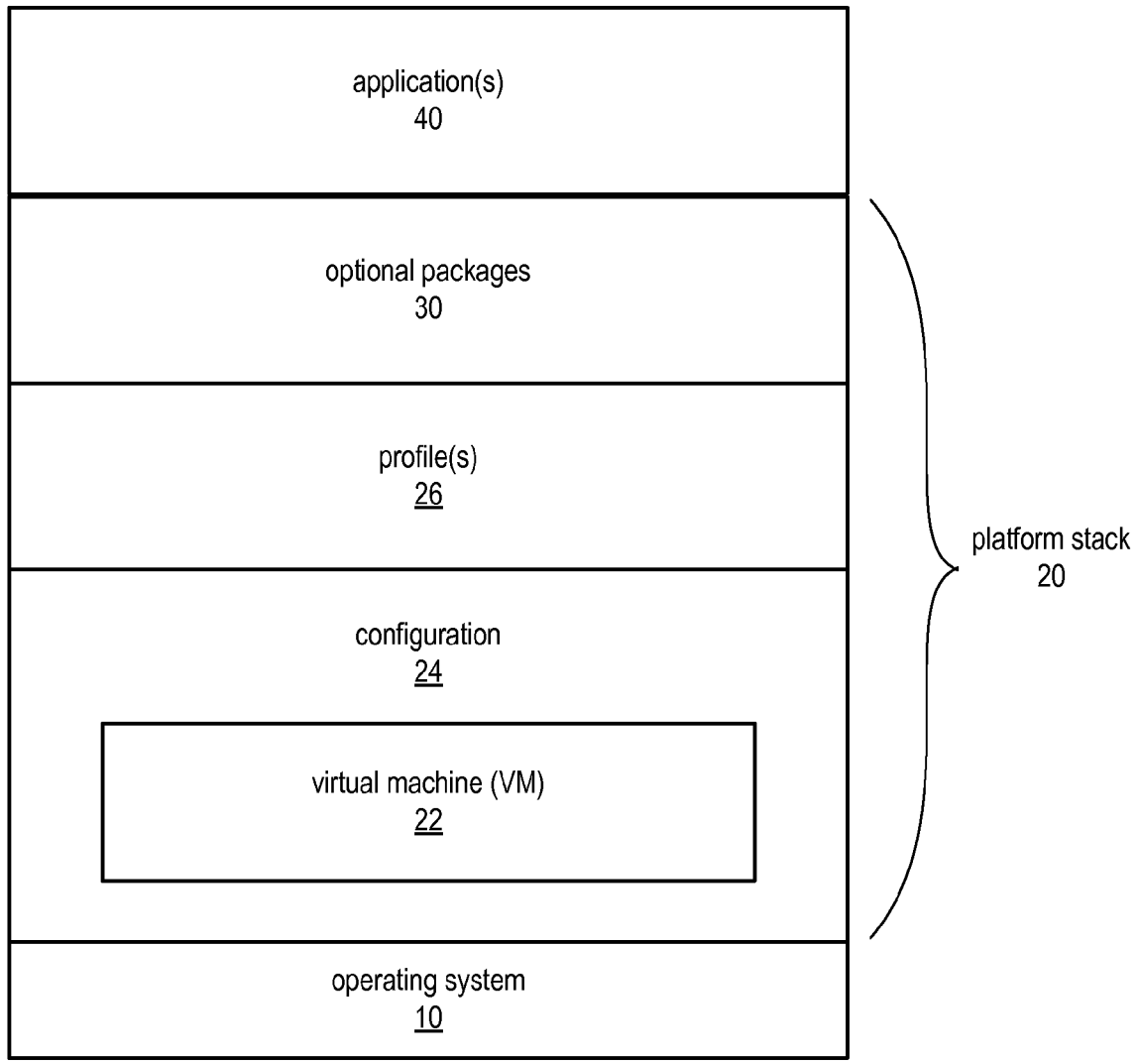
FIG. 1 is a block diagram illustrating a conventional Java ME® platform stack on a device.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF THE EMBODIMENTS

Embodiments of methods and apparatus for security protection domain-based testing are described. A testing framework is described that enables the same certification tests to be run across different protection domains or operation modes, and on different platforms or devices. A certification process using the testing framework is also described. The certification process includes a configuration/setup phase and a test execution phase. During the configuration/setup phase, a security mode may be specified, a set of permissions are determined for the current security mode, mappings of permissions between security modes are generated according to a set of mapping rules, results of the mapping are added to the set of permissions, protection domain descriptions are edited according to the set of permissions, and the protection domains are validated. During the test execution phase, for each protection domain to be tested, the testing framework automatically selects the appropriate tests that have the correct permissions for the current protection domain and queues the selected tests for execution. Once all queued tests are executed, results may be reviewed and, if one or more tests have failed, the implementation under test may be modified accordingly and the testing process may be repeated.

Embodiments of the testing framework may be directed to testing implementations of the Java Platform, Micro Edition (Java ME®) using Connected Device Configuration (CDC) or Connected Limited Device Configuration (CLDC) as the configuration layer and Mobile Information Device Profile (MIDP) as the profile layer. Different Mobile Information Device Profile (MIDP) specifications (e.g., MIDP 2.x and MIDP 3.x specifications) may be supported. The MIDP specification defines several security protection domains (which may be referred to as protection domains for simplicity). A protection domain may be defined as a set of permissions that controls which protected APIs an applet can use. For example, MIDP 2.x and/or MIDP3.x may support the following protection domains as defined by the respective specification: Operator, Manufacturer, Identified 3rd Party, Unidentified 3rd Party, and Custom. Embodiments of the testing framework enable the same certification tests to be run on the different protection domains and on different platforms or devices for both MIDP 2.x and MIDP3.x implementations.

Embodiments of the testing framework may be used for MIDP3.x/CLDC and MIDP3.x/CDC security tests. The security-sensitive tests may be reused for testing in different security protection domain modes. Embodiments of the testing framework may provide a unified approach for protection domain-based testing suitable for many or all MIDP and CDC/CLDC test suites, and may provide the ability to design tests in a platform security-agnostic manner. At least some embodiments may provide a method to annotate the tests in MIDP 3.x security terms to thus maximize specification and functional coverage of MIDP 3.s security.

Embodiments of the testing framework may reuse existing tests for security-sensitive APIs developed for conventional technology compatibility kits (TCKs) (e.g., conventional MIDP/CLDC TCKs). The existing tests may be reused in the testing framework with relatively few modifications and with little or no loss of specification and functional coverage.

Embodiments of the testing framework provide the ability to test specification assertions corresponding to concrete protection domains. The following is an example of such an assertion, and is not intended to be limiting:

"The secure element push (card emulation mode) described in Appendix B. of JSR 257 MUST be restricted to the Operator Domain when the secure element resides in the operator provided UICC."

Embodiments of the testing framework may test all available protection domains defined by the specification under test. Embodiments of the testing framework may minimize the changes necessary in protection domains on production devices to enable the testing. Embodiments of the testing framework may allow tests and test suites to be designed that will function on compatible (conforming with specification requirements) devices with minimal security assumptions. Embodiments of the testing framework may provide the same or similar user experience for all TCKs (e.g., CDC/J2ME). Embodiments of the testing framework may guarantee the presence and correct configuration of all specified protection domains upon successful certification with the technology compatibility kit (TCK). Embodiments of the testing framework unify different TCK test types from the viewpoint of test selection, i.e., Over the Air (OTA) tests from the viewpoint of test operator are selected and run by the same rules as automated tests. This may make certification rules easier to understand and remember, and may reduce the amount of documentation that is required. Embodiments of the testing framework may maximize security testing coverage with minimal investment. Embodiments may thus reduce test development time and cost.

While embodiments are primarily described herein in the context of the Java ME® platform, CDC/CLDC, and MIDP (e.g., MIDP 2.x and MIDP 3.x), note that embodiments of the testing framework may be adapted for use in other similar testing environments, and may be adapted for use in for use with other configurations and/or profiles in the Java ME® platform.

Testing Framework Environment

Figure 2:
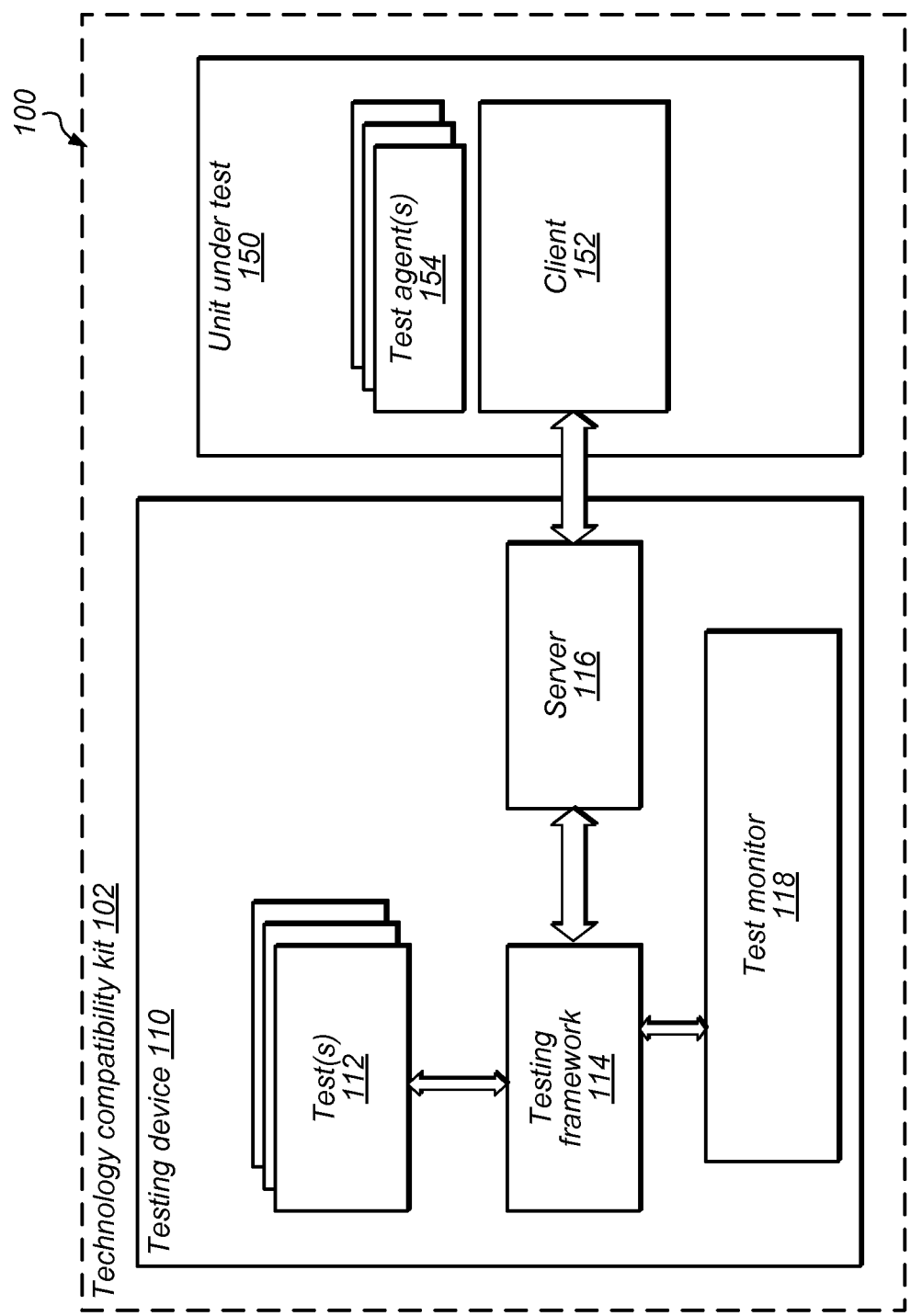
FIG. 2 is a block diagram of an example testing environment in which embodiments of the testing framework may be implemented, according to at least some embodiments.

FIG. 2 is a block diagram of an example testing environment 100 in which embodiments of the testing framework may be implemented, according to at least some embodiments, and broadly illustrates various other components of the testing environment 100. Embodiments of the testing framework 114 may be deployed in the context of compatibility testing and technology compatibility kits (TCKs). Embodiments of the testing framework 114 may, for example, be applied in compatibility testing for Java ME® platform technology implementations (e.g., unit under test 150). Compatibility testing may be defined as the process of testing an implementation (e.g., unit under test 150) to make sure it is compatible with a corresponding Java® technology specification, e.g. a Java® Specification Request (JSR). A suite of tests 112 contained in a technology compatibility kit (TCK) 102 is typically used to test that the implementation meets and passes all of the compatibility rules of that JSR. Broadly defined, a technology compatibility kit (TCK) 102 may be defined as a suite of one or more tests 112, a set of tools (e.g., testing framework 114, test monitor 118, server 116, client 152, one or more test agents 154, etc.), and documentation that allows an implementer of a Java technology specification to determine if the Java technology implementation (e.g., unit under test 150) is compliant with the specification.

Figure 9:
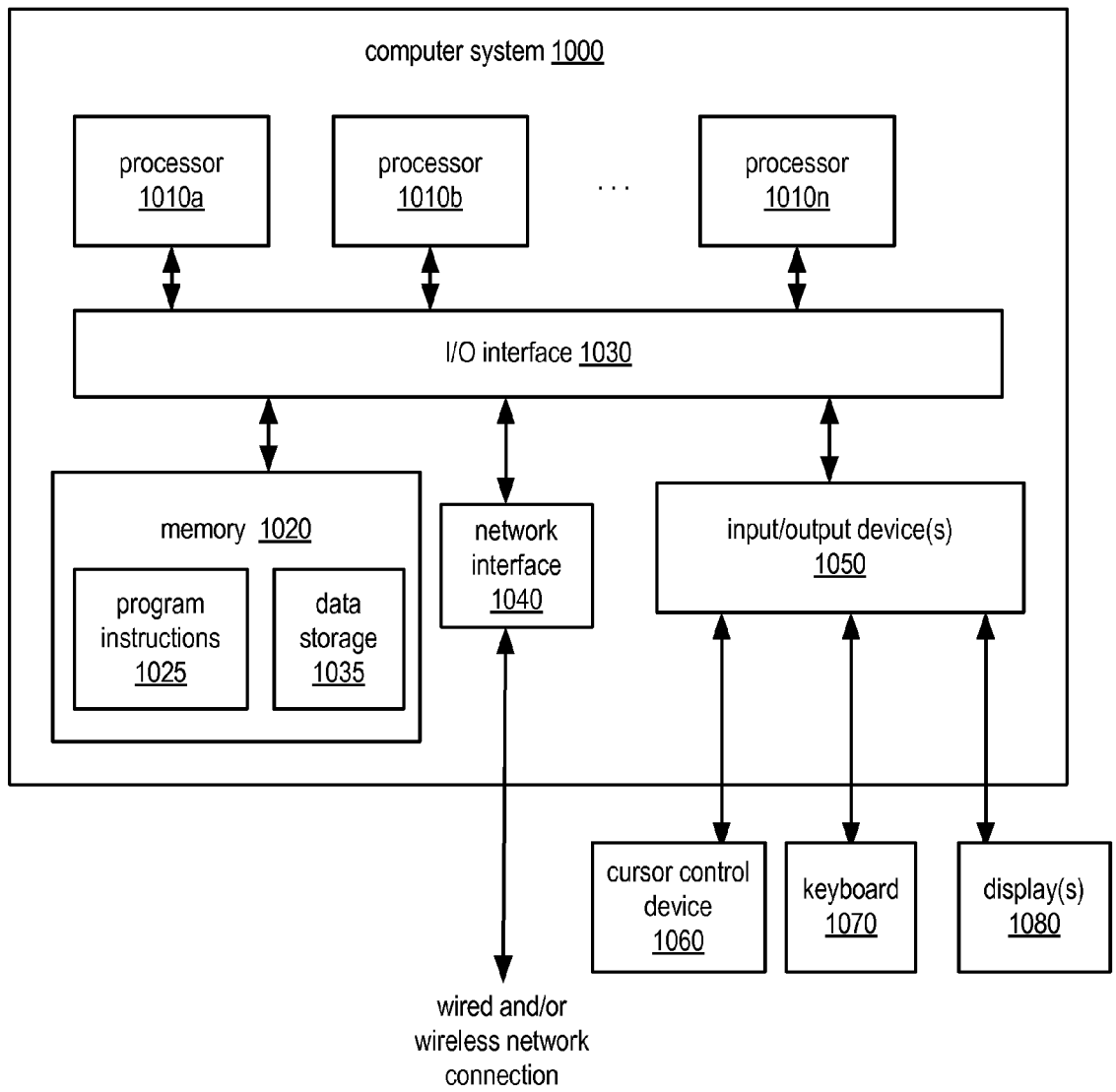
FIG. 9 is a block diagram of a computing device, according to some embodiments.

In at least some implementations, the testing device 110 and unit under test 150 are separate devices. The testing device 110 may include tests 112, testing framework 114, test monitor 118, and server 116. FIG. 9 illustrates an example computer system that may be used as a testing device. The unit under test 150 may be, but is not necessarily, a relatively limited mobile and/or embedded device such as a mobile/cell phone, smart phone, tablet or pad device, Personal Digital Assistant (PDA), camera, control device, set-top box, game console, home appliance, and so on.

In at least some embodiments, a test 112 may include the source code and any accompanying information that exercise a particular feature, or part of a feature, of a Java technology implementation to make sure that the feature complies with the Java specification's compatibility rules. A single test 112 may contain multiple test cases. Accompanying information can include test documentation, auxiliary data files, or other resources used by the source code. In at least some embodiments, tests 112 correspond to assertions of the Java specification.

In at least some embodiments, server 116 is a relatively lightweight server that functions to connect to and communicate with (forward data to and receive data from) the client 152 on unit under test 150. Generally, server 116 contains no internal test-related logic.

Test monitor 118 may be used to synchronize and monitor testing and test agent activity. Test monitor 118 may provide a user interface that, for example, displays the test agent pool (tests queued for execution) and the test agents currently in use, and may also display test results or other information.

Testing framework 114 may act as a test provider to the server 116. Testing framework 114 may provide test data to server 116 to be passed on to client 152 on the unit under test 150. Server 116 may in turn pass data received from the client 152 to testing framework 114. Additional functionality of testing framework 114 is further described later in this document.

Unit under test 150 may include the Java® ME platform implementation to be tested. Unit under test 150 may include client 152 and one or more test agents 154. A function of client 152 is to receive test data from server 116 and return test results to server 116. A test agent 154 is an application (e.g., a MIDlet suite) that receives tests from the testing device 110 via client 152, runs the test on the Java® ME platform implementation being tested (unit under test 150), and reports the results to the testing device 110 via client 152.

FIG. 2 broadly describes an example testing environment 100 for compatibility testing and technology compatibility kits (TCKs) in which embodiments of the testing framework 114 as described herein may be implemented. For more detailed information, see *Java® ME TCK Framework Developers Guide*, Version 1.2.1.

Test Format

Embodiments of the testing framework 114 may employ a test format for tests 112 that provides more flexibility than conventional approaches, for example flexibility to support tests that are MIDP 3.x or profile-agnostic (e.g., applicable to both MIDP 2.x/3.x). Embodiments of the testing framework 114 and test format enable tests 112 to be developed that are MIDP version agnostic, and thus may enable a test 112 designed and developed for MIDP 2.x to be successfully run on MIDP 3.x implementations, and vice versa.

In at least some embodiments, a test description's grant/deny attributes' values may be extended to include the list of permissions of both MIDP 2.x and 3.x types. For example, a test 112 whose grant and deny attribute values are:

grant: javax.microedition.io.file.read\
  {javax.microedition.io.HttpProtocolPermission "http://localhost:9055"}\
  {javax.microedition.io.PushRegistryPermission "*" "static,dynamic,alarm"}
deny: javax.microedition.io.file.write\
  {javax.microedition.io.HttpProtocolPermission "http://localhost:9056"}\ may be selected for execution in the protection domains where the following are true:

MIDP 2.x permission "javax.microedition.io.file.read" is "Allowed" or "User"

The following MIDP 3.x permissions are "Allowed" or "User":
  {javax.microedition.io.HttpProtocolPermission "http://localhost:9055"}
  {javax.microedition.io.PushRegistryPermission "*" "static,dynamic,alarm"}

During test execution, all three permissions from the "grant" attribute value may be requested in the test MIDlet suite manifest and will be granted to the test application code during runtime. However, the permissions from the "deny" attribute values will not be requested in the test MIDlet suite manifest, and as a consequence will be denied to the test.

As an example, consider a security sensitive API call from the test above:

javax.microedition.io.Connector.open("http://localhost:9056/context/index.html");

When the test description is expressed in terms of MIDP 2.x security (i.e., the "grant" attribute value may only contain MIDP 2.x named permissions), or when the testing is done on an MIDP 2.x implementation, this call is performed from the MIDP 2.x MIDlet suite and may result in:

a returned Connection instance if the permission:
  "javax.microedition.Connector.http"
is requested in the manifest, and permission is "Allowed" or "User" in the protection domain to which the MIDlet suite is bound (in the latter case, the user allows to grant a permission)

a Security Exception if the permission:
  "javax.microedition.Connector.http"
is not requested in the manifest, or alternatively if the permission:
  "javax.microedition.Connector.http"
is set to User in the protection domain to which the MIDlet suite is bound, is requested in the manifest, and the user is not allowed to grant the permission.

In other words, all permissions for access to HTTP are either granted or denied at the schema level, i.e., it is not possible to deny HTTP access to particular hosts/ports.

MIDP 3.x permissions provide more flexibility in security management than do MIDP 2.x permissions, which in turn results in different requirements for test design in the MIDP 3.x case. Consider the following example using the above test description. A call to:

javax.microedition.io.Connector.open("http://localhost:9056/context/index.html");

needs a permission to be granted to the MIDlet suite:
  (H) javax.microedition.io.HttpProtocolPermission
  "http://localhost:9056/context/index.html"

This will result in:

a returned Connection instance if there is a MIDP2.x/3.x permission request for a permission P where P implies (H) and:
  the permission request for P is a mandatory request and P, or is a permission P1, implying P, is Allowed or User in the protection domain to which the MIDlet suite is bound (in latter case the user allows to grant P); OR
  the permission request for P is an optional request and in the protection domain to which the MIDlet suite is bound there is an Allowed or User permission P1 that implies (H).

a Security Exception if:
  the MIDlet suite manifest does not contain a request for a permission P such as P implies (H); OR
  the MIDlet suite manifest contains an "-Opt" permission request for a permission which implies (P), but the protection domain to which the MIDlet suite is bound does not contain a permission that implies (H).

Existing tests including one or more calls to security sensitive APIs may contain lists of necessary permissions in their descriptions (e.g. "javax.microedition.io.file.read, javax.microedition.apdu.sat" or MIDP 3.x permissions). In at least some embodiments, these values are placed into to a Java Archive (JAR) file manifest/Java Application Descriptor (JAD) permission request with the test via the MIDP 2.x manifest attribute "MIDlet-Permissions" (or MIDP 3.x manifest attribute MIDlet-Permission-<n>, if needed), according to the specification requirements.

In at least some embodiments, to extend this approach to MIDP 3.x, the list of MIDP permissions may be converted to corresponding MIDP 3.x permissions. More precise attribute definitions may be made according to the protection domain and specification requirements. The same test code may be executed in the preconfigured security environment.

Test Suite

Embodiments of the testing framework described herein correctly execute security sensitive tests on, for example, MIDP3.x/CLDC and MIDP3.x/CDC stacks. Components of the test suite may include a runtime test execution framework (the testing framework 114) and the tests 112 to be executed. Functions of the testing framework may include, but are not limited to, the following:

Test management (bundling, provisioning, test results collecting, distributed test components management, test configuring etc.);

Communication to the underlying test harness;

Test run management; and

Runtime test execution environment description (i.e., abilities of the unit under test)

Tests are described by property tables referred to as test descriptions, and include information used by the testing framework to perform its functions. The following sections further describe the tests and the testing framework according to embodiments.

Test Descriptions

Table 1, shown in FIG. 4, lists several test description attributes that may be used in the security testing approach implemented by the testing framework, according to at least some embodiments. Table 1 provides the attribute names in the left column, with a description of the respective attribute and its provided in the right column.

The test description attribute "suitableForDomains <domain ID list>" specifies a list of protection domains in which the test is to be executed. If the test description includes the attributes "grant" and/or "deny", all of the listed protection domains must allow these attributes requirements to be followed.

The test description attribute "doubleDutySecurity yes" specifies that, during runtime, the test description will be duplicated to all protection domains that do not contradict the test description's "grant" and "deny" attributes. If the original test description does not include the attribute "suitebleForDomains=<domain ID list>", the duplicates will include the attribute "suitableForDomains="ID"" for all protection domains defined in the test framework. Otherwise, the duplicates will include all protection domains mentioned in "suitebleForDomains=<domain ID list>" in the original test description.

The test description attribute "grant <permissions list>" specifies that the test may only be run in protection domains where all permissions from <permissions list> are either Allowed or User.

The test description attribute "deny <permissions list>" specifies that the test may only be run in protection domains where all permissions from <permissions list> will be denied during the test run.

Testing Framework and Runtime Testing Framework Description

Components of the testing framework include, but are not limited to, one or more executable modules and a runtime testing framework description. In at least some embodiments, the runtime testing framework description may include mappings from MIDP 2.x to MIDP 3.x, and vice versa, for all permissions mentioned by the set of test descriptions.

Protection Domain Descriptions

In at least some embodiments, the runtime testing framework description may include definitions and descriptions for all protection domains considered in the test suite (in general, of all protection domains mentioned by the specification under test). In at least some embodiments, a protection domain description may split all permissions referenced by the test descriptions into three groups: "Allowed", "User", and "Not Permitted".

In at least some embodiments, the testing framework may provide one or more methods for editing the protection domain descriptions. This may be referred to as a protection domain editor feature.

In at least some embodiments the testing framework may validate the protection domain descriptions to ensure that certification can be performed using the protection domain descriptions as described. In at least some embodiments, validation involves ensuring that a protection domain description does not contradict the test suite's security assumptions. Test suite security assumptions may include, but are not limited to, the following:

All requirements mentioned in Table 1 should be satisfied for every test. In other words, there are no tests that are not selected in any protection domain due to Table 1 conditions.

Permissions for the test agent (e.g., a MIDlet application) can be granted (i.e., are Allowed or User) in all protection domains.

TCK Use Case: Certification

Figure 3:
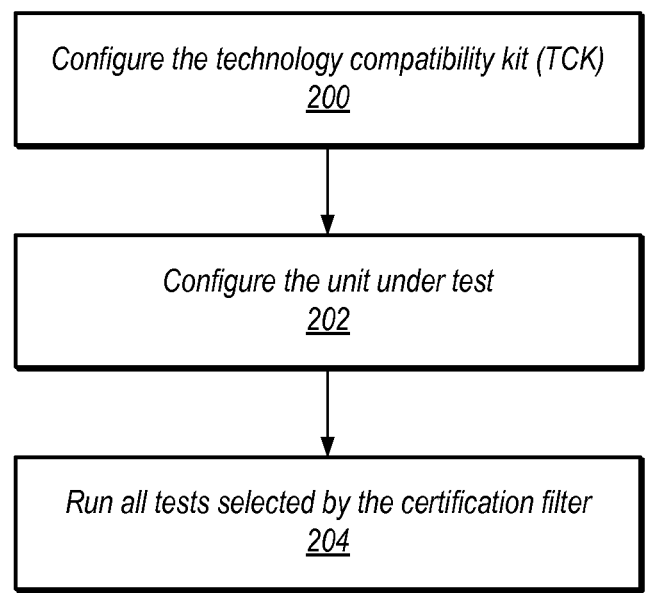
FIG. 3 is a high-level flowchart of a method for performing certification testing using a technology compatibility kit (TCK) that implements the testing framework described herein, according to at least some embodiments.

To certify the Java ME® platform implementation under test with the technology compatibility kit (TCK), all tests selected by the certification filter should be selected and executed according to the runtime testing framework description. FIG. 3 is a high-level flowchart of a method for performing certification testing using a TCK that implements the testing framework described herein, according to at least some embodiments.

As indicated at 200, the TCK is configured. As part of TCK configuration, all protection domains to be considered by the TCK should be described as part of the runtime testing framework description (see above). During the process of describing the protection domains, the testing framework validates the protection domain descriptions against the test suite security assumptions (see Table 1) and may only allow the TCK configuration to be completed if all of the test suite security assumptions are met for all of the protection domain descriptions.

As indicated at 202, security policy on the unit under test may be configured to comply with the protection domain descriptions as specified during TCK configuration.

As indicated at 204, all tests selected by the certification filter may then be run. In at least some embodiments, to run the tests, for each described protection domain, the following are performed until all tests are run:

change the current protection domain in the runtime testing framework description to this protection domain; and select and run all of the tests for the current protection domain.

Test Run Details

The following describes automated tests and over-the-air tests using embodiments of the testing framework implanted in a technology compatibility kit (TCK).

Automated Tests

During a test run, automated tests may be packaged into MIDlet suites. According to the information provided in the test descriptions, permission requests may be added following the rules as illustrated in Table 2, which is shown in FIG. 5. Table 2 shows how "Grant" and "Deny" permissions are present in the test description in the left column, and shows the respective permission modes in the current protection domain in the other three columns (Allowed, User, or Not Permitted). As shown in Table 2, if the permission in the test description is "Grant . . . "P" . . . ":

For permission mode "Allowed": permission is requested in the mandatory permission request (see, e.g., Example 1).

For permission mode "User": permission is requested in the mandatory permission request (see, e.g., Example 1).

For permission mode "Not Permitted": the test will not be selected for execution in the current protection domain.

If the permission in the test description is "Deny . . . "P" . . . ":

For permission mode "Allowed": permission is not requested in the manifest (see, e.g., Example 1).

For permission mode "User": permission is not requested in the manifest (see, e.g., Example 1).

For permission mode "Not Permitted": permission is not requested in the manifest (see, e.g., Example 1).

Table 3 in FIG. 6 shows rules for mapping permissions between MIDP versions (MIDP 2.x and MIDP 3.x), according to at least some embodiments. Depending on the MIDP version under test, a mandatory permission request for permission "P" mentioned in the test is evaluated according to the rules in Table 3. As shown in Table 3, if "P"=MIDP 2.x permission, then "P" goes into the permission request if MIDP 2.x implementation is tested. If MIDP 3.x implementation is tested, then the result of lookup (MIDP 3.x permission) goes into the permission request. If "P"=MIDP 3.x permission, then the result of lookup (MIDP 2.x permission) goes into the permission request if MIDP 2.x implementation is tested. If MIDP 3.x implementation is tested, then "P" goes into the permission request.

Given that in Table 3,
"P"=javax.microedition.io.HttpProtocolPermission "http://localhost",
the following examples demonstrate application of the rules in Table 2.

Example 1

The permission:
javax.microedition.io.HttpProtocolPermission "http://localhost"
or a permission which implies that:
javax.microedition.io.HttpProtocolPermission "http://localhost")
is "Allowed" in the current protection domain, so "P" is requested in the mandatory permission request, i.e., the manifest will include an attribute:
MIDlet-Permission-<n>:
javax.microedition.io.HttpProtocolPermission "http://localhost"

Example 2

All permissions implying a permission:
javax.microedition.io.HttpProtocolPermission "http://localhost"
are "Not Permitted" in the current protection domain, and the manifest will not include a permission request attribute with this permission in the request. As a consequence of this rule, test descriptions should not include "grant P1" and "deny P2" where P1 implies P2 or where P2 implies P1.

In at least some embodiments, when an automated test is bundled, the following rule is applied. If two test descriptions that are selected to be run one by one include different values of "Grant" and/or "Deny" attributes, the tests will not be packaged into the same MIDlet suite.

In at least some embodiments, during a test execution, the user may be required to answer "Yes" to security prompts.

Over the Air (OTA) Tests

In at least some embodiments, Over the Air (OTA) tests may include pre-packaged MIDlet suite Java Archive (JAR) files with ready manifests which are not expected to be modified during the test run. As a consequence, these tests may not be MIDP version-agnostic. In addition, existing tests may require "*" permissions. For example, to communicate to the server in the testing framework, an OTA test's MIDlet suite may need HTTP protocol permission to a concrete port on a concrete machine, but the machine name and port may not be known until testing framework (TF) configuration).

In at least some embodiments, to minimize security requirements for OTA tests, the following may be implemented:

An OTA test's test description (TD) "Grant" and "Deny" attribute values are specified to reflect the minimal permissions that are actually needed by the test.

MIDlet suite manifests of OTA tests may be modified to contain optional permission requests instead of mandatory ones.

OTA test selection rules may be the same as described in Table 2, with the only exclusion being that an OTA test bundle is not created during the test run. From the viewpoint of the test operator, there is no difference between automated and OTA tests.

In at least some embodiments, during a test execution, the user may be required to answer "Yes" to security prompts unless the user is asked explicitly to deny a particular permission in the OTA test prompt.

Certification Process Using Embodiments

Figure 7A:
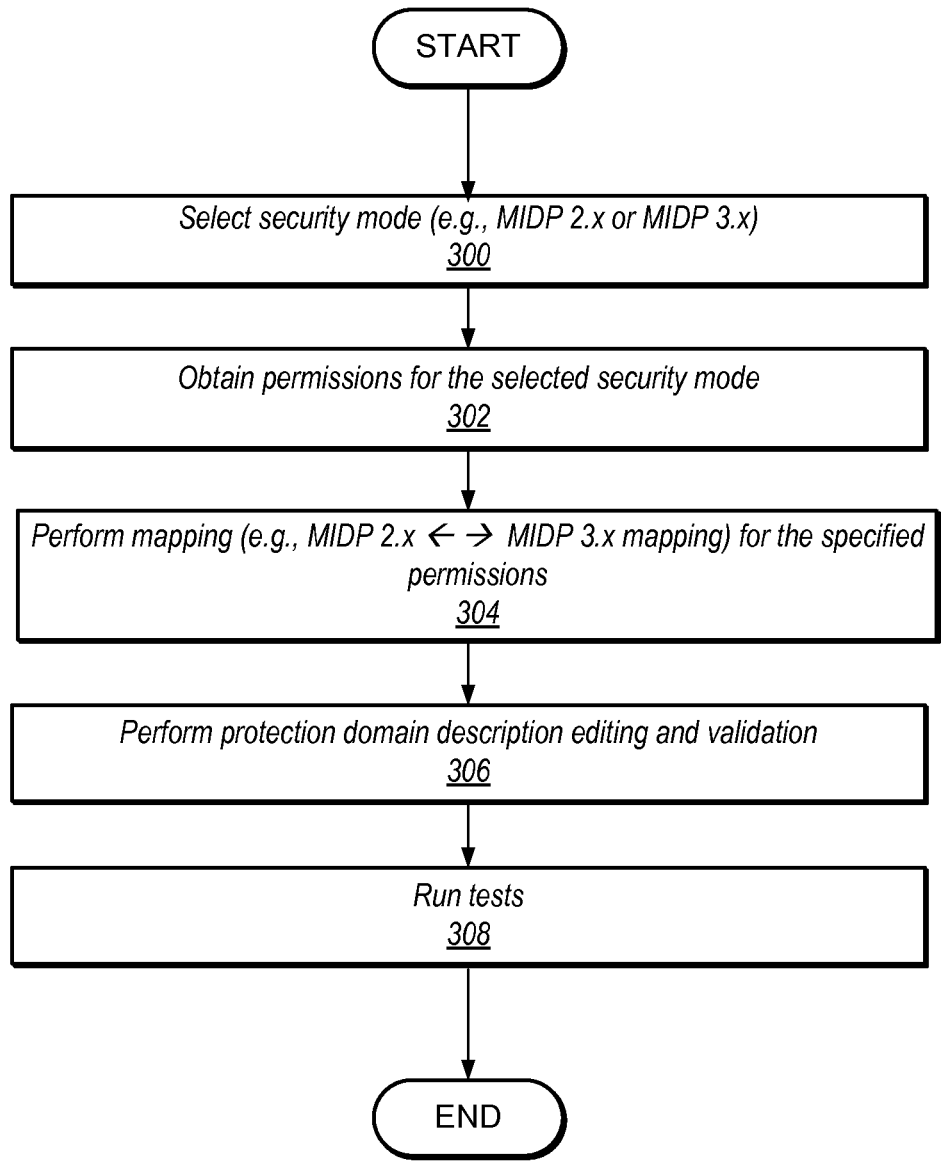
FIGS. 7A and 7B are high-level flowcharts of a method for applying the security protection domain-based testing framework in a certification process for certifying various Java ME® platform implementations, according to at least some embodiments.
Figure 7B:
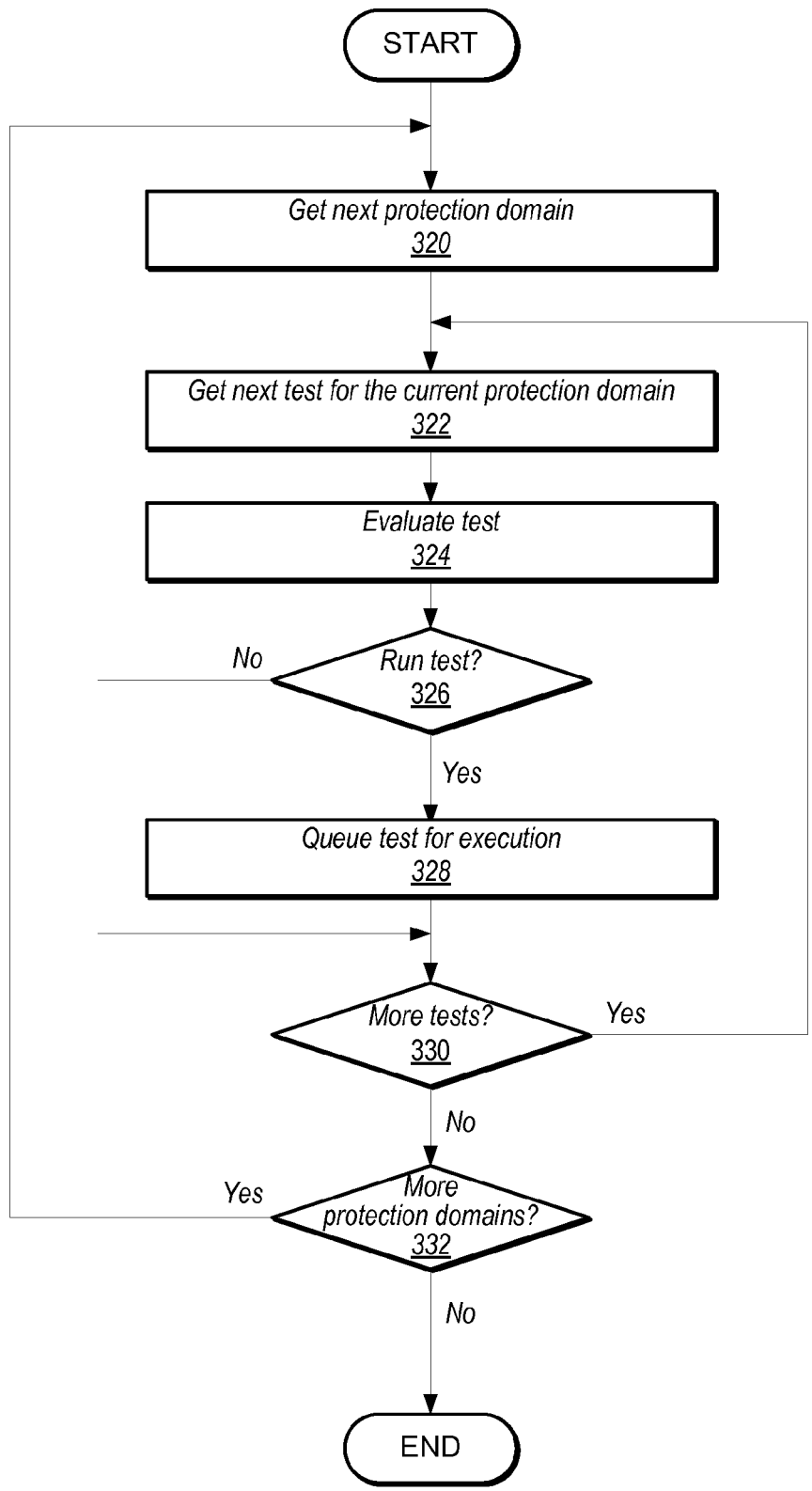

FIGS. 7A and 7B are high-level flowcharts of a method for applying the security protection domain-based testing framework in a certification process for certifying various Java ME® platform implementations, according to at least some embodiments. The method as illustrated in FIGS. 7A and 7B may at least in part be executed by one or more software modules on a testing device such as testing device 110 of FIG. 2. FIG. 9 illustrates an example computer system that may be used as a testing device.

FIG. 7A is a high-level flowchart of the overall process, which includes a setup/configuration phase (elements 300 through 306) and a test execution phase (element 308). As indicated at 300, a security mode may be selected in which the test(s) are to be run. For example, either MIDP 2.x or MIDP 3.x may be selected. As indicated at 302, permissions for the selected security mode may be obtained. For example user input via a user interface to the testing framework may be obtained that specifies a set of permissions according to the selected security mode/profile specification. See, e.g., Tables 1 and 2. As indicated at 304, mapping of the permissions between security modes may be performed. For example, the permissions may be mapped from MIDP 2.x to MIDP 3.x, or vice versa. See, e.g., Table 3, which shows rules for mapping permissions between MIDP versions (MIDP 2.x and MIDP 3.x), according to at least some embodiments. As indicated at 306, protection domain editing and validation may be performed. As part of the configuration process, all protection domains to be considered may be described as part of the runtime testing framework description, for example using a domain editor component of the testing framework. During the process of describing the protection domains, the testing framework validates the protection domain descriptions against the test suite security assumptions (see Table 1) and may only allow the configuration to be completed if all of the test suite security assumptions are met for all of the protection domain descriptions. Note that MIDP 2.x and/or MIDP3.x may support the following protection domains as defined by the respective specification:

Operator
Manufacturer
Identified 3rd Party
Unidentified 3rd Party
Custom

As indicated at 308, after the configuration is complete, the tests may be run. FIG. 7B describes element 308 of FIG. 7A in more detail.

FIG. 7B is a high-level flowchart of the test execution process (element 308 in FIG. 7B), according to at least some embodiments. As can be seen in the flowchart, test(s) are evaluated and executed on the unit under test for each protection domain in which the test(s) are to be run. The outer loop that iterates through the protection domains is shown by elements 320-332, and the inner loop that, for the current protection domain, evaluates the tests and queues at least some of the tests for execution is shown by elements 322-330.

As indicated at 320, the method may get a next protection domain under which the tests are to be run on the unit under test. Note that the protection domains may be processed in any order. Also note that all or a subset of the protection domains may be tested for a given implementation.

As indicated at 322, the next test for the current protection domain may be obtained from the suite of tests to be applied to this implementation. Note that the tests may be processed in any order. An example test format for the tests is described in the section titled Test Format. As indicated at 324, the test may be evaluated according to one or more criteria to determine whether the test is to be executed. See FIG. 8B for more details of test evaluation.

At 326, if the evaluation determines that the test is to be executed, the test is queued for execution on the unit under test, as indicated at 328. If the evaluation determines that the test is not to be executed, the test is not queued for execution. At 330, if there are more tests to be evaluated for the current protection domain, then the method returns to element 322. If all the tests have been evaluated for the current protection domain, then at 332, if there are more protection domains to be tested, the method returns to element 320 to get the next protection domain. Otherwise, the method is complete. Note that test(s) may still be running on the unit under test and results of tests may still be received at the testing device from the unit under test.

Figure 8A:
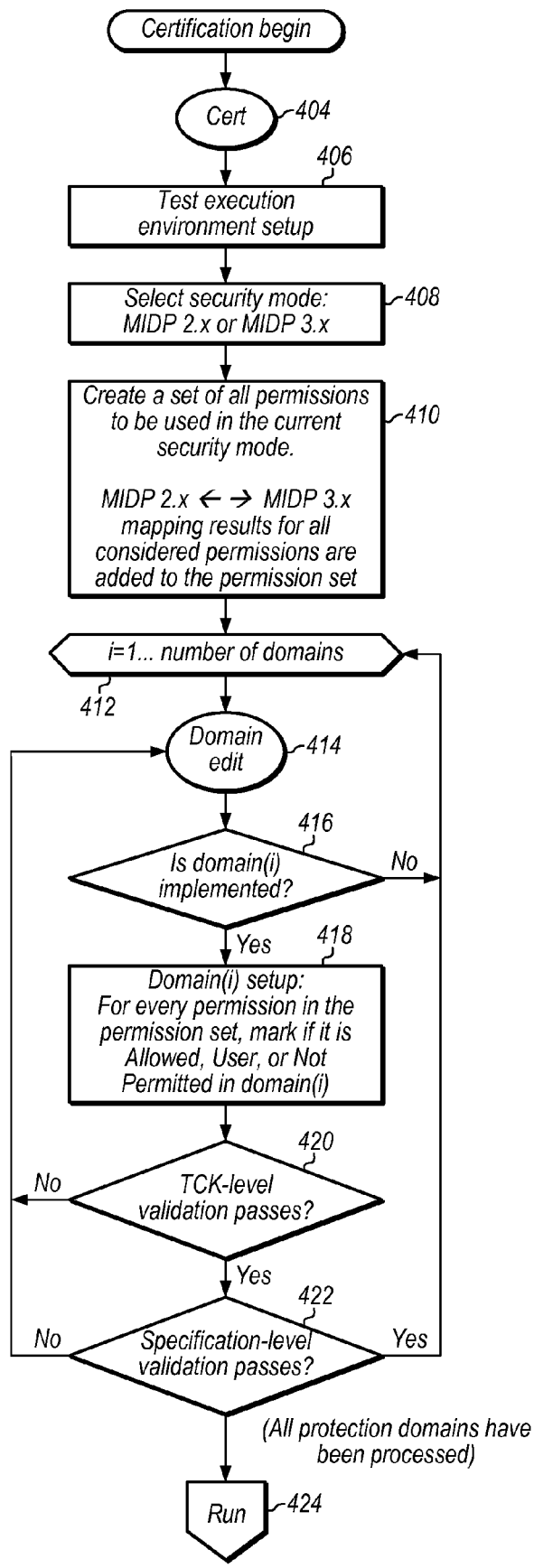
FIGS. 8A and 8B are more detailed flowcharts of a method for applying the security protection domain-based testing framework in a certification process for certifying Java ME® platform implementations, according to at least some embodiments.
Figure 8B:
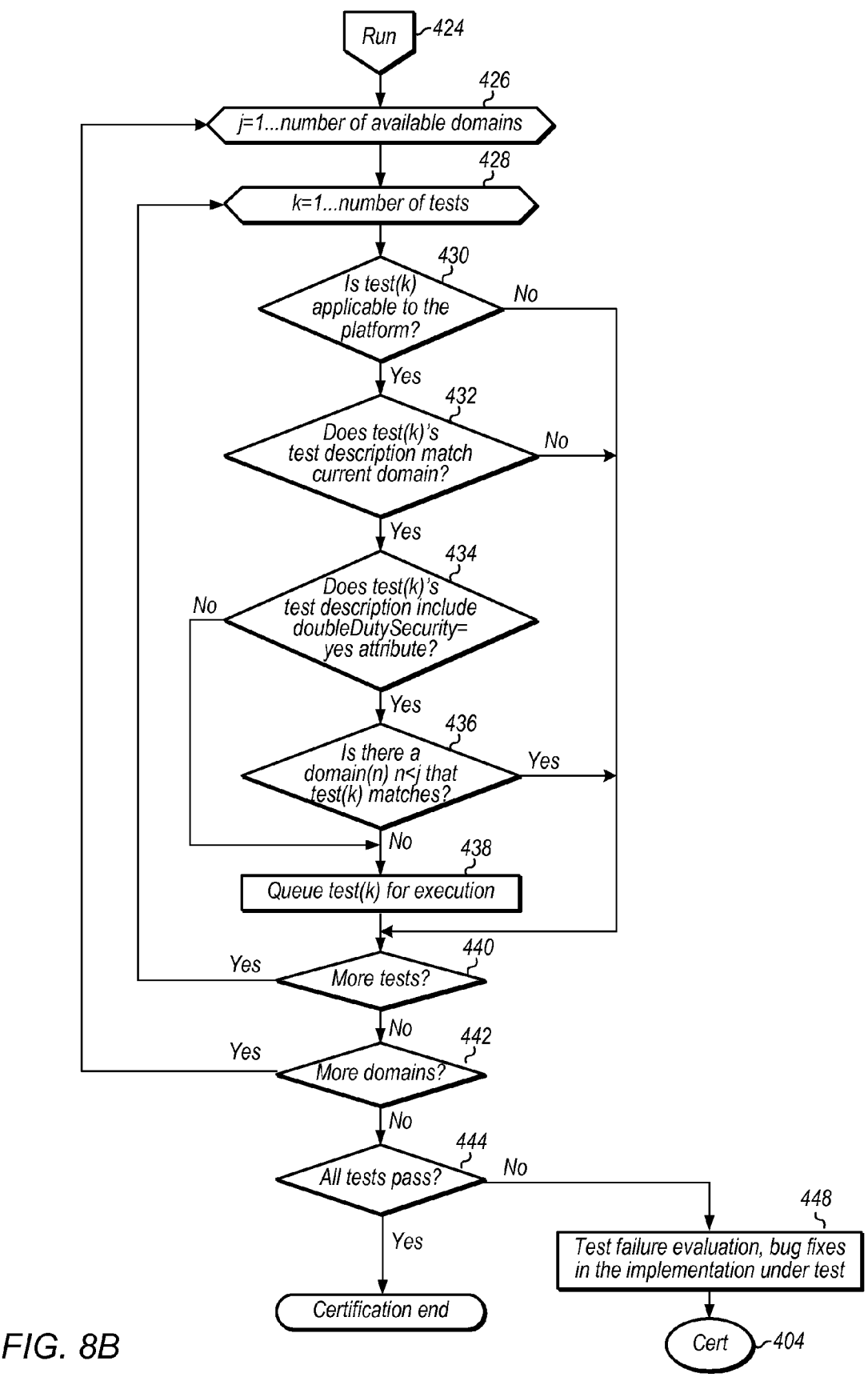

FIGS. 8A and 8B are more detailed flowcharts of a method for applying the security protection domain-based testing framework in a certification process (the beginning of which is indicated by element 404) for certifying Java ME® platform implementations, according to at least some embodiments. The method as illustrated in FIGS. 8A and 8B may at least in part be executed by one or more software modules on a testing device such as testing device 110 of FIG. 2. FIG. 9 illustrates an example computer system that may be used as a testing device.

FIG. 8A provides a more detailed flowchart of the setup/configuration process (elements 300 through 306 of FIG. 7A), according to at least some embodiments. As indicated at 406, the test execution environment may be set up as necessary. The test execution environment setup may include, for example, installing software, obtaining tests, configuring the unit under test, and any other initial configurations or setups that are necessary.

As indicated at 408, a current security mode may be selected. For example, either MIDP 2.x or MIDP 3.x may be selected.

As indicated at 410, a set of all permissions to be used in the current security mode may be created. See, e.g., Tables 1 and 2. In addition, mapping of the permissions between security modes may be performed. For example, the permissions may be mapped from MIDP 2.x to MIDP 3.x, or vice versa. See, e.g., Table 3, which shows rules for mapping permissions between MIDP versions (MIDP 2.x and MIDP 3.x), according to at least some embodiments. The MIDP 2.x←—→MIDP 3.x mapping results for all considered permissions are added to the permission set.

Elements 412 through 422 expand on element 306 (performing protection domain description editing and validation) of FIG. 7A. As part of the configuration process, all protection domains to be considered may be described as part of the runtime testing framework description, for example using a domain editor component of the testing framework. During and/or after the process of describing the protection domains, the testing framework validates the protection domain descriptions against the test suite security assumptions (see Table 1) and may only allow the configuration to be completed if all of the test suite security assumptions are met for all of the protection domain descriptions.

At 412 of FIG. 8A, a first protection domain is obtained. At 414, editing and validation of the current protection domain begins. At 416, if the current protection domain is not implemented on the Java ME® platform implementation to be tested, then the method returns to 412 to get the next protection domain, if any. If the current protection domain is implemented, then at 418 editing of the current protection domain description is performed. During editing, for every permission in the permission set, the permission is marked as "Allowed", "User", or "Not Permitted" in the current protection domain description. In at least some embodiments, a user interface may be provided that includes one or more user interface elements that allow a user to perform the editing of the protection domain descriptions.

During and/or after protection domain description editing, validation of the current protection domain is performed. In at least some embodiments, the validation may include technology compatibility kit (TCK)-level validation and specification-level validation. As shown at 420 and 422, if either the TCK-level validation or the specification-level validation fails, the method returns to 414 so that the current protection domain description can be re-edited to overcome the failure(s). If both the TCK-level validation and the specification-level validation pass, and if there are more protection domains to be edited and validated, then the method returns to 412 to get the next protection domain. If both the TCK-level validation and the specification-level validation pass, and if there are no more protection domains to be edited and validated, then the test run 424 is ready to begin. FIG. 8B continues the flowchart and illustrates the test execution process (424).

FIG. 8B provides a more detailed flowchart of the test execution process (element 308 of FIG. 7A), according to at least some embodiments. In particular, elements 430 through 436 of FIG. 8B expand on element 324 (evaluate test) of FIG. 7B. As can be seen in the flowchart, test(s) are evaluated and executed on the unit under test for each protection domain in which the test(s) are to be run. The outer loop that iterates through the available protection domains is shown by elements 426-442, and the inner loop that, for the current protection domain, evaluates the tests and queues at least some of the tests for execution is shown by elements 428-440.

As indicated at 426, the method may get a next protection domain (domain(j)) under which the tests are to be run on the unit under test. Note that the protection domains may be processed in any order. Also note that all or a subset of the protection domains may be tested for a given implementation. Domains that are not implemented on the implementation under test are not tested.

As indicated at 428, the next test (test(k)) for domain(j) may be obtained from the suite of tests to be applied to this implementation. Note that the tests may be processed in any order. An example test format for the tests is described in the section titled Test Format.

At 430, if test(k) is not applicable to the platform implementation under test, then the method jumps to element 440. No further evaluation of test(k) is performed, and test(k) is not queued for execution. If test(k) is applicable to the platform implementation under test, then the method proceeds to element 432.

At 432, if the test description for test(k) does not match the current protection domain (domain(j)), then the method jumps to element 440. In at least some embodiments, this involves comparing permissions specified by test(k)'s test description to permissions specified by the protection domain description corresponding to domain(j). If the test description does not match the current protection domain, no further evaluation of test(k) is performed, and test(k) is not queued for execution. If the test description for test(k) does match the current protection domain, then the method proceeds to element 434.

At 434, if the test description for test(k) does not include the doubleDutySecurity=yes attribute (see, e.g., Table 1), then the method jumps to element 438, and test(k) is queued for execution. If the test description for test(k) does include the doubleDutySecurity=yes attribute, then the method proceeds to element 436.

At 436, test(k) for domain(j) is compared to other protection domains. If there is a domain(n), where n<j, that test(k) matches, then the method jumps to element 440. Test(k) is not queued for execution. If a matching domain is not found, then the method proceeds to element 438, and test(k) is queued for execution.

At 438, if the evaluation has determined that the test is to be executed, the test is queued for execution on the unit under test.

At 440, if there are more tests to be evaluated for domain(j), then the method returns to element 428. If all the tests have been evaluated for domain(j), then at 442, if there are more protection domains to be tested, the method returns to element 426 to get the next protection domain.

At 444, as or after the tests are executed on the unit under test, results of the tests are evaluated. If all the tests passed, then certification is done. Otherwise, if any test does not pass, then at 448 the test failure(s) may be evaluated, and the Java ME® platform implementation may be modified accordingly to fix any problems that were identified. The certification process 404 may then be performed again. In at least some embodiments, one or more of the elements in FIG. 8A may not need to be performed on subsequent certification runs on the same Java ME® platform implementation.

Example System

Various components of embodiments of the methods for security protection domain-based testing as described herein may be executed on one or more computer systems, which may interact with various other devices. One such computer system is illustrated by FIG. 9. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions, components, or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of a method for security protection domain-based testing, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement embodiments of the method for security protection domain-based testing, and data storage 1035, comprising various data accessible by program instructions 1025. In one embodiment, program instructions 1025 may include software elements of embodiments of a method for security protection domain-based testing, as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a method for security protection domain-based testing as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for testing platform implementations, comprising:

performing, by a testing device, for a platform implementation under test:

obtaining a set of permissions according to a particular profile specification, wherein the particular profile specification defines a particular profile, wherein a profile provides APIs for supporting a category of devices and is included in a platform stack that provides a platform runtime environment for the category of devices;

mapping the permissions according to the particular profile specification to another profile specification, wherein said mapping is performed according to a set of permission mapping rules for mapping permissions between the particular profile and the other profile;

adding results of said mapping to the set of permissions, wherein said results are permissions according to the other profile specification, wherein after said adding, the set of permissions comprises permissions according to both the particular profile specification and the other profile specification;

determining a plurality of protection domain descriptions that each correspond to a respective protection domain supported by the particular profile specification or by the other profile specification, wherein the protection domains specify different operation modes for the APIs provided by the particular profile or the other profile;

subsequent to said adding and subsequent to said determining, editing and validating the plurality of protection domain descriptions according to the set of permissions that includes permissions according to both the particular profile specification and the other profile specification; and for each of the determined plurality of protection domains implemented by the platform implementation under test, determining, from a suite of tests, one or more tests that are to be executed on the platform implementation under test and queuing the one or more tests for execution on the platform implementation under test under the respective protection domain such that tests are queued to test the platform implementation under test operating in each of the different operation modes for the protection domains corresponding to the determined plurality of protection domain descriptions according to both the particular profile specification and the other profile specification.

2. The method as recited in claim 1, wherein said editing and validating a plurality of protection domain descriptions according to the set of permissions comprises, for each of the plurality of protection domains that is implemented by the platform implementation under test:

editing the respective protection domain description, wherein said editing comprises, for each permission in the set of permission, marking the respective permission as Allowed, User, or Not Permitted in the respective protection domain description; and validating the respective protection domain description according to one or more validation criteria.

3. The method as recited in claim 1, wherein said determining, from a suite of tests, one or more tests that are to be executed on the platform implementation under test comprises, for each test in the suite of tests:

determining if the test is applicable to the platform implementation under test; and determining if permissions specified in a respective test description for the test match permissions specified in the protection domain description of the current protection domain;

wherein the test is not queued for execution if the test not applicable to the platform implementation under test or if the permissions specified for the test do not match the permissions specified for the current protection domain.

4. The method as recited in claim 3, wherein said editing the respective protection domain description is performed via input to a user interface.

5. The method as recited in claim 3, wherein the platform implementation under test is a Java Platform, Micro Edition (Java ME®) platform implementation.

6. The method as recited in claim 1, wherein the particular profile specification is a Mobile Information Device Profile (MIDP) specification, and wherein the other profile specification is a different version of the MIDP specification.

7. The method as recited in claim 1, wherein the platform stack further includes a configuration that is below the profile in the platform stack and that provides a basic set of libraries and APIs for the platform implementation.

8. The method as recited in claim 7, wherein the configuration is one of Connected Device Configuration (CDC) or Connected Limited Device Configuration (CLDC).

9. A system comprising:
at least one processor; and
a memory storing program instructions, wherein the program instructions are executable by the at least one processor to:

obtain a set of permissions according to a particular profile specification, wherein the particular profile specification defines a particular profile, wherein a profile provides APIs for supporting a category of devices and is included in a platform stack that provides a platform runtime environment for the category of devices;

map the permissions according to the particular profile specification to another profile specification, wherein said mapping is performed according to a set of permission mapping rules for mapping permissions between the particular profile and the other profile;

add results of said mapping to the set of permissions, wherein said results are permissions according to the other profile specification, wherein after said adding, the set of permissions comprises permissions according to both the particular profile specification and the other profile specification;

determine a plurality of protection domain descriptions that each correspond to a respective protection domain supported by the particular profile specification or by the other profile specification, wherein the protection domains specify different operation modes for the APIs provided by the particular profile or the other profile;

subsequent to said adding and subsequent to said determining, edit and validate the plurality of protection domain descriptions according to the set of permissions that includes permissions according to both the particular profile specification and the other profile specification; and for each of the determined plurality of protection domains that is implemented by the platform implementation under test, determine, from a suite of tests, one or more tests that are to be executed on the platform implementation under test and queue the one or more tests for execution on the platform implementation under test under the respective protection domain such that tests are queued to test the platform implementation under test operating in each of the different operation modes for the protection domains corresponding to the determined plurality of protection domain descriptions according to both the particular profile specification and the other profile specification.

10. The system as recited in claim 9, wherein, to edit and validate a plurality of protection domain descriptions according to the set of permissions, the program instructions are executable by the at least one processor to, for each of the plurality of protection domains that is implemented by the platform implementation under test:

obtain input editing the respective protection domain description, where said input specifies, for each permission in the set of permission, a respective permission of Allowed, User, or Not Permitted in the respective protection domain description; and validate the respective protection domain description according to one or more validation criteria.

11. The system as recited in claim 9, wherein, to determine, from a suite of tests, one or more tests that are to be executed on the platform implementation under test, the program instructions are executable by the at least one processor to, for each test in the suite of tests:

determine if the test is applicable to the platform implementation under test; and determine if permissions specified in a respective test description for the test match permissions specified in the protection domain description of the current protection domain;

wherein the test is not queued for execution if the test not applicable to the platform implementation under test or if the permissions specified for the test do not match the permissions specified for the current protection domain.

12. The system as recited in claim 11, wherein the platform implementation under test is a Java Platform, Micro Edition (Java ME®) platform implementation.

13. The system as recited in claim 9, wherein the particular profile specification is a Mobile Information Device Profile (MIDP) specification, and wherein the other profile specification is a different version of the MIDP specification.

14. The system as recited in claim 9, wherein the platform stack further includes a configuration that is below the profile in the platform stack and that provides a basic set of libraries and APIs for the platform implementation, wherein the configuration is one of Connected Device Configuration (CDC) or Connected Limited Device Configuration (CLDC).

15. A non-transitory computer-readable storage medium storing program instructions, wherein the program instructions are computer-executable to implement:
   obtaining a set of permissions according to a particular profile specification, wherein the particular profile specification defines a particular profile, wherein a profile provides APIs for supporting a category of devices and is included in a platform stack that provides a platform runtime environment for the category of devices;
   mapping the permissions according to the particular profile specification to another profile specification, wherein said mapping is performed according to a set of permission mapping rules for mapping permissions between the particular profile and the other profile;
   adding results of said mapping to the set of permissions, wherein said results are permissions according to the other profile specification, wherein after said adding, the set of permissions comprises permissions according to both the particular profile specification and the other profile specification;
   determining a plurality of protection domain descriptions that each correspond to a respective protection domain supported by the particular profile specification or by the other profile specification, wherein the protection domains specify different operation modes for the APIs provided by the particular profile or the other profile;
   subsequent to said adding and subsequent to said determining, editing and validating the plurality of protection domain descriptions according to the set of permissions that includes permissions according to both the particular profile specification and the other profile specification; and
   for each of the determined plurality of protection domains that is implemented by the platform implementation under test, determining, from a suite of tests, one or more tests that are to be executed on the platform implementation under test and queuing the one or more tests for execution on the platform implementation under test under the respective protection domain such that tests are queued to test the platform implementation under test operating in each of the different operation modes for the protection domains corresponding to the determined plurality of protection domain descriptions according to both the particular profile specification and the other profile specification.

16. The non-transitory computer-readable storage medium as recited in claim 15, wherein, in said editing and validating a plurality of protection domain descriptions according to the set of permissions, the program instructions are computer-executable to implement, for each of the plurality of protection domains that is implemented by the platform implementation under test:
   editing the respective protection domain description, wherein said editing comprises, for each permission in the set of permission, marking the respective permission as Allowed, User, or Not Permitted in the respective protection domain description; and
   validating the respective protection domain description according to one or more validation criteria.

17. The non-transitory computer-readable storage medium as recited in claim 15, wherein, in said determining, from a suite of tests, one or more tests that are to be executed on the platform implementation under test, the program instructions are computer-executable to implement, for each test in the suite of tests:
   determining if the test is applicable to the platform implementation under test; and
   determining if permissions specified in a respective test description for the test match permissions specified in the protection domain description of the current protection domain;
   wherein the test is not queued for execution if the test not applicable to the platform implementation under test or if the permissions specified for the test do not match the permissions specified for the current protection domain.

18. The non-transitory computer-readable storage medium as recited in claim 17, wherein the platform implementation under test is a Java Platform, Micro Edition (Java ME®) platform implementation.

19. The non-transitory computer-readable storage medium as recited in claim 15, wherein the particular profile specification is a Mobile Information Device Profile (MIDP) specification, and wherein the other profile specification is a different version of the MIDP specification.

20. The non-transitory computer-readable storage medium as recited in claim 15, wherein the platform stack further includes a configuration that is below the profile in the platform stack and that provides a basic set of libraries and APIs for the platform implementation, wherein the configuration is one of Connected Device Configuration (CDC) or Connected Limited Device Configuration (CLDC).

* * * * *